(12) United States Patent
Sun et al.

(10) Patent No.: US 8,405,986 B2
(45) Date of Patent: Mar. 26, 2013

(54) MOTHERBOARD WITH FAN CONTROL CIRCUIT

(75) Inventors: Zheng-Heng Sun, Taipei Hsien (TW); Kang Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 307 days.

(21) Appl. No.: 12/981,527

(22) Filed: Dec. 30, 2010

(65) Prior Publication Data

US 2012/0155016 A1 Jun. 21, 2012

(30) Foreign Application Priority Data

Dec. 16, 2010 (CN) .......................... 2010 1 0591552

(51) Int. Cl.
*H05K 7/20* (2006.01)
*G06F 1/20* (2006.01)

(52) U.S. Cl. ........ 361/695; 361/690; 361/694; 361/719; 713/300

(58) Field of Classification Search .................... None
See application file for complete search history.

(56) References Cited

U.S. PATENT DOCUMENTS

| 6,291,956 | B1 * | 9/2001 | Ku ................................. 318/445 |
| 6,400,045 | B1 * | 6/2002 | Hosokawa et al. ........... 307/117 |
| 6,654,894 | B2 * | 11/2003 | Kaminski et al. ............. 713/300 |
| 6,906,901 | B1 * | 6/2005 | Liu .............................. 361/103 |
| 7,256,562 | B2 * | 8/2007 | Lee ............................... 318/268 |
| 7,839,636 | B2 * | 11/2010 | Hiroi ............................ 361/695 |
| 8,049,450 | B2 * | 11/2011 | Wei .............................. 318/434 |

* cited by examiner

*Primary Examiner* — Boris Chervinsky
(74) *Attorney, Agent, or Firm* — Altis Law Group, Inc.

(57) ABSTRACT

A motherboard includes a first connector, a fan device comprising a fan and a second connector connected to the fan, and a fan control circuit. The fan control circuit includes a primary power terminal connected to a first power terminal of the motherboard, a standby power terminal connected to a second power terminal of the motherboard, a voltage output terminal, and a detection terminal connected to a power state signal terminal of the motherboard to receive a power state signal. When the motherboard is turned off, the fan control circuit is configured to output the voltage of the second power terminal of the motherboard to the power terminal of the fan for a predetermined time according to the power state signal, to make the standby power terminal supply a working voltage to the fan to maintain its rotation for the predetermined duration.

9 Claims, 3 Drawing Sheets

MOTHERBOARD WITH FAN CONTROL CIRCUIT

BACKGROUND

1. Technical Field

The present disclosure relates to motherboards with fan control circuits.

2. Description of Related Art

In a computer system, a central processing unit (CPU) fan is mounted on a CPU to dissipate heat from the CPU. The CPU fan is powered by the motherboard of the computer system. When the computer system is turned off, the CPU fan is turned off and cannot dissipate heat from the CPU, however, the temperature of the CPU remains high, reducing lifetime thereof.

Therefore, a motherboard with a fan control circuit, which can overcome the described limitations, is needed.

DETAILED DESCRIPTION

Figure 1:
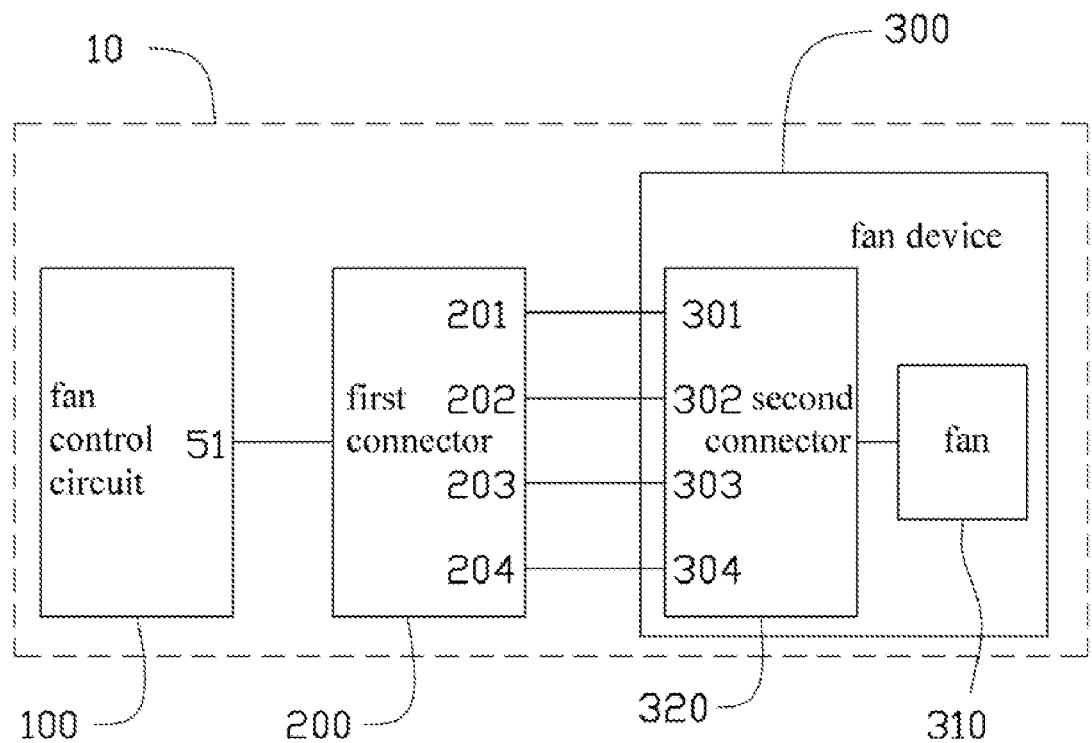
FIG. 1 is a block diagram of a motherboard including a fan control circuit, according to a first embodiment.

FIG. 1 is a block diagram of a motherboard 10 including a fan control circuit 100, according to a first embodiment. The motherboard 10 further includes a first connector 200, and a central processing unit (CPU) fan device 300. The CPU fan device 300 includes a CPU fan 310 and a second connector 320 electrically connected to the fan 310. The first connector 200 is engaged with the second connector 320.

Figure 2:
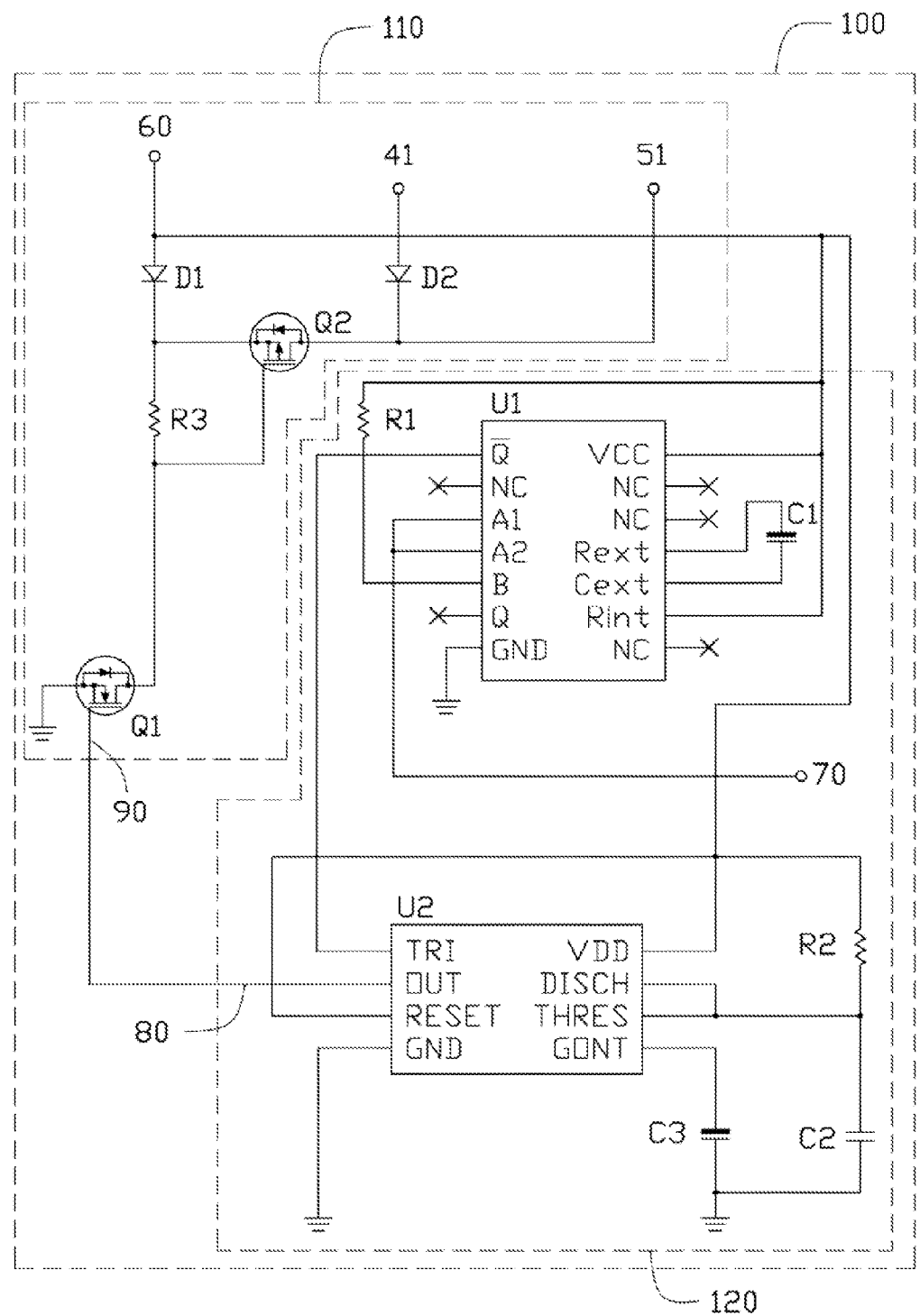
FIG. 2 is a circuit diagram of the fan control circuit of FIG. 1, according to the first embodiment.

The fan control circuit 100 is mounted on the motherboard 10. Referring to FIG. 2, the fan control circuit 100 includes a primary power terminal 41, a standby power terminal 60, a voltage output terminal 51 and a detection terminal 70. The primary power terminal 41 is connected to a first power terminal of the motherboard 10, such as a 12V power source terminal The standby power terminal 60 is connected to a second power terminal of the motherboard 10, such as a 5V power source terminal.

The voltage output terminal 51 is connected to a power terminal of the fan 310 through the first connector 200 and the second connector 320 in order. The detection terminal 70 is connected to a power state signal terminal of the motherboard 10 to receive a power state signal. For example, the power state signal may be a 3V power-good signal of the motherboard 10. When the motherboard 10 is at power-on state, the power state signal is a high-level signal (also defined as logic 1). When the motherboard 10 is turned off, the power state signal is a low-lever signal (also defined as logic 0).

When the motherboard 10 is turned on, the fan control circuit 100 outputs the voltage of the first power terminal of the motherboard 10 to the power terminal of the fan 301 through the primary power terminal 41 and the voltage output terminal 51 according to a first state of the power state signal, to rotate the fan 310. When the motherboard 10 is turned off, the fan control circuit 100 outputs the voltage of the second power terminal of the motherboard 10 to the power terminal of the fan 310 for a predetermined time according to a second state of the power state signal, to make the standby power terminal supply a working voltage for the fan to continue to maintain rotation of the fan 310 for the predetermined time.

In detail, the first connector 200 includes a voltage pin 201, a ground pin 202, a control pin 203, and a detection pin 204. The voltage pin 201 is connected to the voltage output terminal 51. The ground pin 202 is grounded. The detection pin 204 is connected to a fan rotation speed counter (not shown) of the motherboard 10 to detect the rotation speed of the CPU fan 310. The control pin 203 is connected to a control circuit (not shown) of the motherboard 10. The control circuit outputs a pulse width modulation (PWM) signal to adjust a rotation speed of the CPU fan 310 through the control pin 203.

The second connector 320 includes a voltage receptacle 301, a ground receptacle 302, a control receptacle 303, and a detection receptacle 304. The voltage receptacle 301 is connected to the power terminal of the fan 310. The voltage pin 201 is received in the voltage receptacle 301. The ground pin 202 is received in the ground receptacle 302. The control pin 203 is received in the control receptacle 303. The detection pin 204 is received in the detection receptacle 304. Thus, the voltage output terminal 51 is connected to the power terminal of the fan 310 through the voltage pin 201 and the voltage receptacle 301.

The fan control circuit 100 includes a detection control circuit 120 and a power output circuit 110. The detection control circuit 120 includes the detection terminal 70, a control output terminal 80, a first control chip U1, a second control chip U2, resistors R1 and R2, and capacitors C1-C3. In one embodiment, the first control chip U1 is a mono-flop, and the second control chip U2 is a Schmitt trigger. In other embodiments, the first and second control chips U1 and U2 can be changed according to need.

The power output circuit 110 includes the primary power terminal 41, the standby power terminal 60, the voltage output terminal 51, a control receiving terminal 90, a first diode D1, a second diode D2, a first electrical switch Q1, a second electrical switch Q2, and a resistor R3.

The first control chip U1 includes a voltage pin VCC, a ground pin GND, an inner resistor pin Rint, an external resistor pin Rext, an external capacitor pin Cext, a positive trigger input pin B, two negative trigger input pins A1 and A2, and a negative pulse output pin $\overline{Q}$. The voltage pin VCC and the inner resistor pin Rint are connected to the standby power terminal 60. The external resistor pin Rext is connected to the external capacitor pin Cext through the capacitor C1. The capacitor C1 and a resistor (not shown) in the first control chip U1 form a resistor-capacitor (RC) circuit to generate a pulse signal. The negative trigger input pins A1 and A2 are connected to the power state signal terminal of the motherboard 10 through the detection terminal 70. The positive trigger input pin B is connected to the voltage pin VCC through the resistor R1. The ground pin GND is grounded.

The second control chip U2 includes a trigger pin TRI, a voltage pin VDD, a reset pin RESET, a ground pin GND, an output pin OUT, a threshold pin THRES, a discharge pin DISCH, and a control voltage pin GONT. The trigger pin TRI is connected to the negative pulse output pin $\overline{Q}$ of the first control chip U1. The voltage pin VDD and the reset pin RESET are connected to the standby power terminal 60. The ground pin GND is grounded. The control voltage pin GONT is grounded through the capacitor C3. The resistor R2 and the capacitor C2 are connected in series between the voltage pin VDD and ground to form an RC circuit to adjust a width of a pulse signal output by the second control chip U2. The threshold pin THRES and the discharge pin DISCH are connected to a node between the resistor R2 and the capacitor C2. The output pin OUT is connected to the control receiving terminal 90 of the power output circuit 110 through the control output terminal 80 of the detection control circuit 120. The control receiving terminal 90 is connected to a control terminal of the first electrical switch Q1. A first terminal of the first electrical switch Q1 is grounded. A second terminal of the first electrical switch Q1 is connected to a control terminal of the second electrical switch Q2, and connected to a cathode of the first diode D1 through the resistor R3. An anode of the first diode D1 is connected to the standby power terminal 60. A first terminal of the second electrical switch Q2 is connected the cathode of the first diode D1. A second terminal of the second electrical switch Q2 is connected to a cathode of the second diode D2, and connected to the voltage output terminal 51. An anode of the second diode D2 is connected to the primary power terminal 41 to receive the 12V voltage from the motherboard 10.

In use, the second connector 320 is engaged with the first connector 200. When the motherboard 10 is at a power-on state, the power state signal terminal outputs a high level signal (the first state logic 1 of the power state signal) to the two input pins A1 and A2 of the first control chip U1, as shown in FIG. 2. As a result of the two pins A1 and A2 receiving the high level signal, the first control chip U1 is disabled and outputs no signals to the second control chip U2. The second control chip U2 is not triggered. The first electrical switch Q1 is turned off. The second electrical switch Q2 is turned off. The second diode D2 is turned on by the anode receiving the 12V voltage from the motherboard 10. The 12V voltage is output to the voltage output terminal 51 to supply a working voltage to maintain rotation of the CPU fan 310 to dissipate heat from the CPU.

When the motherboard 10 is turned off, the 12V voltage is interrupted. The second diode D2 is turned off. The signal output by the power state signal terminal changes from a high level to a low level (the second state logic 0 of the power state signal, such as changing from logic 1 to logic 0), because the two input pins A1 and A2 receive the signal, which changes from the high level to the low level, the first control chip U1 is triggered. The output pin $\overline{Q}$ of the first control chip U1 outputs a negative pulse. The second control chip U2 is triggered. The second control chip U2 outputs a high level signal to the control terminal of the first electrical switch Q1. The first electrical switch Q1 is turned on. The second electrical switch Q2 is turned on. The 5V voltage from the motherboard 10 is supplied to the voltage output terminal 51 through the first diode D1 and the second electrical switch Q2, to maintain rotation of the CPU fan 310 to dissipate heat from the CPU.

In the embodiment, the value of the resistor R2 is invariable. The resistor R2 and the capacitor C2 form the RC circuit to control the pulse width of the pulse signal output by the second control chip U2, to further control the turn-on time of the first electrical switch Q1. Therefore, the duration of the remaining rotation of fan 310 can be controlled, calculated by the formula $T=1.1 \times R \times C$, where R is designated as the resistance value of the resistor R2 and C is designated as the capacitance value of capacitor C2. For example, in this embodiment, R can be 390000Ω and C can be 0.000047 F, thus $T=1.1 \times 390000 \times 0.000047=20.163$ seconds.

Figure 3:
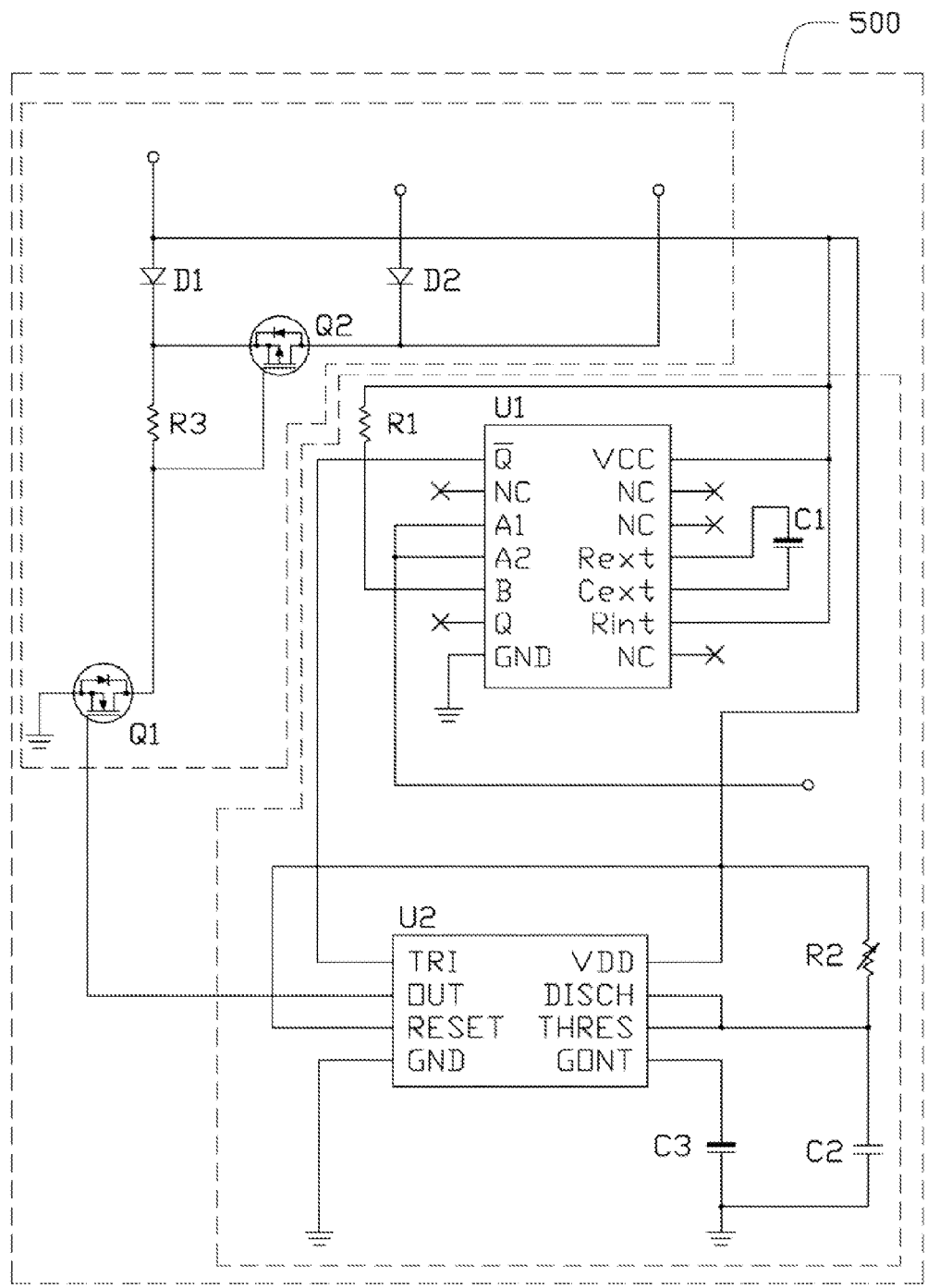
FIG. 3 is a circuit diagram of a motherboard including a fan control circuit, according to a second embodiment.

Referring to FIG. 3, a fan control circuit 500 of a motherboard according to a second embodiment, is shown, differing from the fan control circuit 100 of the first embodiment in that the resistor R2 is a variable resistor, by which duration of the remaining rotation of the fan is easily adjusted.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A motherboard, comprising:
a first connector;
a fan device, comprising a fan and a second connector electrically connected to the fan, the second connector being engaged with the first connector; and
a fan control circuit, comprising:
a primary power terminal connected to a first power terminal of the motherboard;
a standby power terminal connected to a second power terminal of the motherboard;
a voltage output terminal connected to a power terminal of the fan through the first connector and the second connector in order; and
a detection terminal connected to a power state signal terminal of the motherboard to receive a power state signal from the motherboard,
wherein when the motherboard is turned on, the fan control circuit is configured to output the voltage of the first power terminal of the motherboard to the power terminal of the fan through the primary power terminal and the voltage output terminal according to a first state of the power state signal, to rotate the fan, and when the motherboard is turned off, the fan control circuit is configured to output the voltage of the second power terminal of the motherboard to the power terminal of the fan for a predetermined time according to a second state of the power state signal, to make the standby power terminal supply a working voltage for the fan to continue to maintain rotation of the fan for the predetermined time.

2. The motherboard of claim 1, wherein the fan control circuit comprises a detection control circuit and a power output circuit, the detection control circuit comprising the detection terminal and a control output terminal, the power output circuit comprising the primary power terminal, the standby power terminal, the voltage output terminal and a control receiving terminal, the control output terminal being connected to the control receiving terminal, the detection control circuit configured to control the power output circuit to output the voltage of the first power terminal or the voltage of the second power terminal to the power terminal of the fan according to the power state signal.

3. The motherboard of claim 2, wherein the detection control circuit comprises a first control chip, a second control chip, a first resistor, a first capacitor, and a second capacitor, the first control chip comprises two input pins, a first output pin, an external resistor pin, and an external capacitor pin, the second control chip comprises a triggering pin, a second output pin, a threshold pin, and a discharging pin, the input pins of the first control chip are connected to the detection terminal, the first output pin is connected to the triggering pin, the first capacitor is connected between the external resistor pin and the external capacitor pin, the first resistor and the second capacitor are connected in series between the standby power terminal and ground, the threshold pin and the discharging pin are connected to a node between the first resistor and the second capacitor, the second output pin is connected to the control output terminal, wherein when the motherboard is turned off, the power state signal triggers the first control chip to trigger the second control chip to control the power output circuit to output the voltage of the second power terminal of the motherboard to the power terminal of the fan.

4. The motherboard of claim 3, wherein the power output circuit comprises a first electrical switch and a second electrical switch, a control terminal of the first electrical switch is connected to the control receiving terminal, a first terminal of the first electrical switch is grounded, a second terminal of the first electrical switch is connected to a control terminal of the second electrical terminal, and connected to a first terminal of the second electrical switch through a resistor, the first terminal of the second electrical switch is connected to the standby power terminal, a second terminal of the second electrical switch is connected to the primary power terminal.

5. The motherboard of claim 4, wherein the fan control circuit further comprises a first diode and a second diode, an anode of the first node is connected to the standby power terminal, a cathode of the first diode is connected to the first terminal of the second electrical switch, an anode of the second diode is connected to the primary power terminal, a cathode of the second diode is connected to the second terminal of the second electrical switch.

6. The motherboard of claim 4, wherein the second terminal of the second electrical switch is connected to the voltage output terminal.

7. The motherboard of claim 3, wherein the predetermined time is found using the following formula: $T=1.1 \times R \times C$, where T is designated as time value, R is resistance value of the first resistor and C is capacitance value of the second capacitor.

8. The motherboard of claim 7, wherein the first resistor is a variable resistor.

9. The motherboard of claim 1, wherein the first connector comprises a voltage pin, a ground pin, a control pin, and a detection pin, the second connector comprises a voltage receptacle, a ground receptacle, a control receptacle, and a detection receptacle, the voltage pin is received in the voltage receptacle, the ground pin is received in the ground receptacle, the control pin is received in the control receptacle, the detection pin is received in the detection receptacle, the voltage output terminal is connected to the power terminal of the fan through the voltage pin and the voltage receptacle in order.

* * * * *